United States Patent
Tong

(10) Patent No.: US 11,113,857 B2
(45) Date of Patent: Sep. 7, 2021

(54) DISPLAY METHOD AND APPARATUS AND ELECTRONIC DEVICE THEREOF

(71) Applicant: Lenovo (Beijing) Co., Ltd., Beijing (CN)

(72) Inventor: Yanyan Tong, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 137 days.

(21) Appl. No.: 16/457,342

(22) Filed: Jun. 28, 2019

(65) Prior Publication Data
US 2020/0005507 A1    Jan. 2, 2020

(30) Foreign Application Priority Data
Jun. 29, 2018    (CN) .......................... 201810698654.4

(51) Int. Cl.
| | | |
|---|---|---|
| *G06T 11/60* | (2006.01) | |
| *H04N 13/332* | (2018.01) | |
| *G06T 19/00* | (2011.01) | |
| *G06T 5/00* | (2006.01) | |
| *H04N 21/80* | (2011.01) | |

(52) U.S. Cl.
CPC ............ *G06T 11/60* (2013.01); *G06T 19/006* (2013.01); *H04N 13/332* (2018.05); *G06T 5/003* (2013.01); *H04N 21/80* (2013.01)

(58) Field of Classification Search
CPC ....... G06T 11/60; G06T 19/006; G06T 15/00; G06T 2200/24; H04N 13/332; H04N 21/4312; H04N 21/816; G06K 9/00671
See application file for complete search history.

(56) References Cited

U.S. PATENT DOCUMENTS

| | | | | |
|---|---|---|---|---|
| 10,261,749 | B1* | 4/2019 | Wilcox | .................. G06F 3/165 |
| 10,842,568 | B2* | 11/2020 | Hart | ..................... A61B 5/7425 |
| 2013/0169840 | A1* | 7/2013 | Han | .................. H04N 5/23293 |
| | | | | 348/231.99 |
| 2017/0153670 | A1* | 6/2017 | Kim | ...................... G06F 1/1652 |
| 2019/0116353 | A1* | 4/2019 | Lodato | .................. A61B 3/024 |

FOREIGN PATENT DOCUMENTS

| | | |
|---|---|---|
| CN | 106406537 A | 2/2017 |
| CN | 106681503 A | 5/2017 |
| CN | 107329259 A | 11/2017 |
| CN | 107517372 A | 12/2017 |
| CN | 107589846 A | 1/2018 |

\* cited by examiner

*Primary Examiner* — Jingge Wu
(74) *Attorney, Agent, or Firm* — Anova Law Group, PLLC

(57) ABSTRACT

The present disclosure provides a display method. The display method includes displaying a first image based on a first scene; detecting whether a first condition is satisfied; and displaying a second image based on the first condition being satisfied. The first image is an image corresponding to a first portion of the first scene, the second image includes a character image of a viewer and an image of a second portion of the first scene, and the first portion is different from the second portion.

17 Claims, 10 Drawing Sheets

DISPLAY METHOD AND APPARATUS AND ELECTRONIC DEVICE THEREOF

CROSS-REFERENCES TO RELATED APPLICATION

This application claims priority to Chinese Patent Application No. 201810698654.4, entitled "Display Method and Apparatus and Electronic Device Thereof" filed on Jun. 29, 2018, the entire content of which is incorporated herein by reference.

FIELD OF TECHNOLOGY

The present disclosure relates to the field of image processing technology, and more specifically to a display method and apparatus, and an electronic device thereof.

BACKGROUND

Currently, many electronic devices can display virtual scenes for users based on Virtual Reality (VR) or Augmented Reality (AR), and these electronic devices may be televisions, laptops, desktops, smart phones, or wearable devices, etc.

A user may experience the virtual scene through the electronic device, but the user may not be immersed in the process of experiencing some virtual scenes.

BRIEF SUMMARY OF THE DISCLOSURE

A first aspect of the present disclosure provides a display method. The display method includes displaying a first image based on a first scene; detecting whether a first condition is satisfied; and displaying a second image based on the first condition being satisfied. The first image is an image corresponding to a first portion of the first scene, the second image includes a character image of a viewer and an image of a second portion of the first scene, and the first portion is different from the second portion.

A second aspect of the present disclosure provides an electronic device having a first display module for displaying a first image based on a first scene; a detecting module for detecting whether a first condition is satisfied; and a second display module for displaying a second image based on at least the first condition being satisfied. The first image is an image corresponding to a first portion of the first scene, the second image includes a character image of a viewer and an image of a second portion of the first scene, and the first portion is different from the second portion.

A third aspect of the present disclosure provides an electronic device having a display unit for display an image; a memory for storing computer executable instructions; a processor for executing the computer executable instructions to: control the display unit to display a first image based on a first scene; detect whether a first condition is satisfied; and control the display unit to display a second image based on at least the first condition being satisfied. The first image is an image corresponding to a first portion of the first scene, the second image includes a character image of a viewer and an image of a second portion of the first scene, and the first portion being different from the second portion.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

DETAILED DESCRIPTION

Hereinafter, aspects, features, and embodiments of the present disclosure will be described with reference to the accompanying drawings. It should be understood that such description is illustrative only but is not intended to limit the scope of the present disclosure. In addition, it will be understood by those skilled in the art that various modifications in form and details may be made therein without departing from the spirit and scope of the present disclosure.

With the rapid development of Virtual Reality (VR) or Augmented Reality (AR), a user may experience a virtual scene (which may be a virtual scene added in a real image of the real world, or a virtual scene corresponding to virtual reality technology), for example, a user may experience a virtual scene of Antarctic or a virtual scene of the Dinosaur Age.

Often, a user may only experience virtual scenes, such as observing scenes or environments in the virtual scenes, but the user may not observe the scenes of himself in the virtual scenes or the augmented reality scenes. For example, if there is a virtual mirror in the virtual scene, the user may not see himself in the virtual mirror, and only the mirror itself in the virtual scene may be seen (the effect of "looking in the mirror" in the real world may not be realized). In another example, the user may not take a selfie in a first scene. Even if the selfie is taken, the acquired image may be the user in the real world, instead of an image of the user integrated in the first scene. As such, the user may not completely immerse in the virtual scene.

To solve the above problem, an embodiment of the present disclosure provides a display method. The display method of the present disclosure may be applied to an electronic device, and the electronic device may be a head-mounted display device, a laptop, a desktop, a PDA, or a television, etc.

Figure 1:
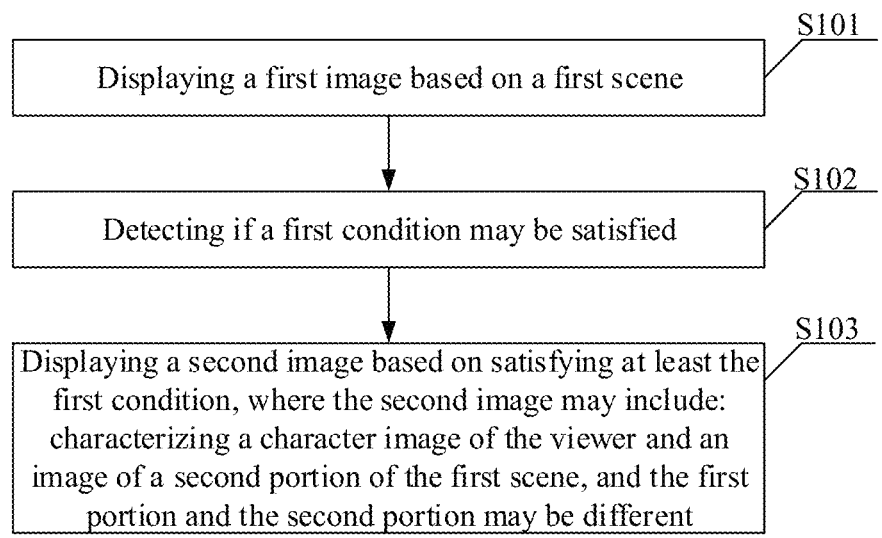
FIG. 1 is a flowchart of an implementation method of a display method according to an embodiment of the present disclosure.

FIG. 1 is a flowchart of an implementation method of a display method according to an embodiment of the present disclosure. The display method is described in more detail below.

S101, displaying a first image based on a first scene.

The first image may be an augmented reality image, and the augmented reality image may be an image based on augmented reality technology that superimposes a virtual image onto a real image in the real world.

In one embodiment, the electronic device may include a display that may display a virtual image. The display may not display a real image of the real world, and the user may see the real image because the real image of the real world may be projected on the user's eyes.

In one embodiment, the electronic device may include a camera, a scene generator, and a display. The camera may record a real image of the real world in real time, the scene generator may generate a virtual image, and the display may display the image after the virtual image is superimposed onto the real image of the real world.

The first image may be a virtual image, and the virtual image may be referred to an image displayed on a display screen of the electronic device based on virtual reality technology. If the first image is a virtual image, the first scene may be pre-stored in the electronic device, and the electronic device may not include a camera that may record the real image of the real world in real time.

Generally, virtual images may not be the real images in the current real world.

In one embodiment, the first image may be an image corresponding to a first portion of the first scene.

S102, detecting if a first condition may be satisfied.

In one embodiment, the first condition may be obtaining information indicating the need to display the viewer integrating into a background image.

The background image will be described below.

In one embodiment, it is assumed that the first image may be a first partial image of the first scene. In the embodiment of the present disclosure, other partial images other than the first partial image in the first scene may be referred to as background images. As shown in FIGS. 2a to 2d, an illustration of an image related to the first scene of an embodiment of the present disclosure is shown.

Figure 2A:
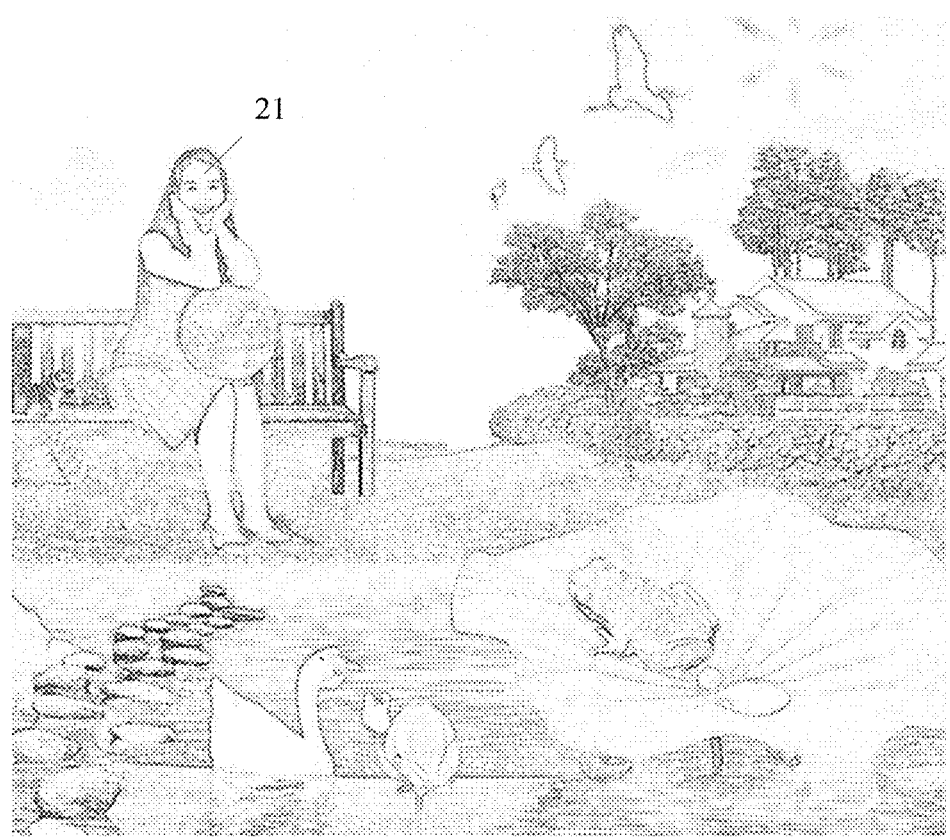
FIGS. 2a to 2d are schematic diagrams of an illustration of an image related to a first scene according to an embodiment of the present disclosure.

Assuming a viewer 21 is in the first scene as shown in FIG. 2a, the viewer 21 may be observing the first partial image in the first scene, e.g., a pond image. For the viewer 21, the viewer 21 currently may only observe the first image (e.g., the pond image) shown in FIG. 2b. The viewer 21 may not observe the background image behind the viewer in the first scene as shown in FIG. 2c.

In summary, the background image may be an image in the first scene that the viewer may not observe when the first image is currently displayed.

There are various implementation methods for detecting whether the first condition is satisfied. The embodiments of the present disclosure provide, but are not limited to, the following methods.

A first method for detecting whether the first condition is satisfied includes: detecting whether an input action of the viewer may belong to a preset action.

In one embodiment, the first condition may be that the input action of the viewer belongs to the preset action, which may be applied to an application scenario in which the viewer may be taking a selfie in the first scene. In this scenario, the preset action may include a plurality of actions and the embodiments of the present disclosure provide, but are not limited to, the following actions.

A first type of preset action: an action of the viewer pretending to hold a device.

It may be understood that in the real world, if the viewer takes a selfie, it may be necessary to take out a device with a camera such as a smartphone, a camera, or a PAD, and hold the device by hand to take the selfie. Similar to the real world, if the viewer needs to take a selfie in the first scene, the viewer may pose the action of pretending to hold the device.

In one embodiment, detecting whether the first condition is satisfied includes: obtaining the viewer's action information during the process of experiencing the first scene; detecting whether the action information may include the action of pretending to hold the device; if the action information includes the action of pretending to hold the device, it may be determined that the first condition is satisfied; and if the action information does not include the action of pretending to hold the device, it may be determined that the first condition is not satisfied.

In one embodiment, there may be two implementation methods of "obtaining the viewer's action information during the process of experiencing the first scene." In the first method, the electronic device to which the display method of the embodiment of the present disclosure may be applied may obtain the action information by itself. In the second method, other electronic devices may obtain the action information and transmit the information to the electronic device to which the display method of the embodiment of the present disclosure may be applied.

For the first method, in one embodiment, the electronic device to which the display method of the embodiment of the present disclosure may be applied may include a camera of a smart glove (the smart glove may need to be worn by the viewer during the process of experiencing the first scene), and the camera or the smart glove may acquire the action information of the viewer during the viewer's process of experiencing the first scene.

Figure 3:
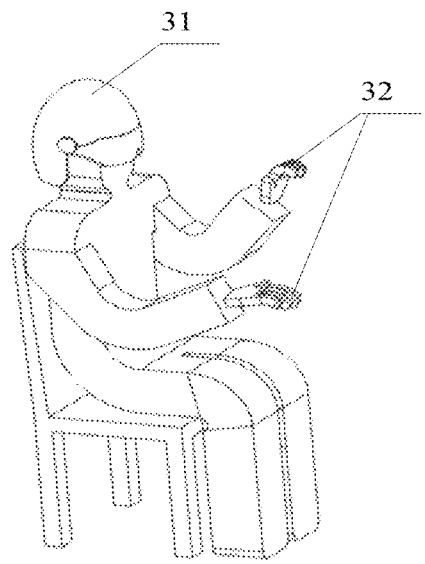
FIG. 3 is a schematic diagram of a first scene in which a viewer is wearing a wearable device according to an embodiment of the present disclosure.

For example, the electronic device to which the display method of the embodiment of the present disclosure may be applied may be a wearable device, and the wearable device may include a head-mounted display device and a smart glove. As shown in FIG. 3, which is a schematic diagram of the first scene in which the viewer is wearing a wearable device according to an embodiment of the present disclosure The wearable device of FIG. 3 may include a head-mounted display device 31 and a smart glove 32.

For the second method, in one embodiment, the electronic device to which the display method of the embodiment of the present disclosure may be applied may not include the camera for obtaining the action information of the viewer during the process of experiencing the first scene, and other electronic devices may include a camera for obtaining the action information of the viewer during the process of the viewer experiencing the first scene and transmit the action information to the electronic device to which the display method of the embodiment of the present disclosure may be applied.

For example, the electronic device to which the display method of the embodiment of the present disclosure may be applied may be a wearable device (if the wearable device does not include a smart glove or a camera), the other electronic device may be a device with a camera, such as a laptop, a smart tv, a PAD, or a smart phone.

A second type of preset action: an action of the viewer holding a virtual device.

In one embodiment, the first scene may include a virtual device configured to collect and display a collection function. For example, the virtual device may be a virtual device with a camera and a display device, such as a virtual camera, a virtual smart phone, a virtual PAD, a virtual laptop, or a virtual desktop. Further, the virtual device may also be a device with a camera, a display device, and a selfie stick.

If the viewer needs to take a selfie, the viewer may hold the virtual device.

In one embodiment, detecting whether the first condition is satisfied includes: determining the first image includes a virtual device configured to collect and display a collection function; obtaining the action information of the viewer during the process of experiencing the first scene; and determining whether the action information includes the action of holding the virtual device based on position information of the virtual device in the first scene and the action information of the viewer in the first scene.

The action information may include: a virtual position of a body part (such as a hand or a foot) in which the viewer may perform the action in the first scene, and/or action posture information. For example, if the position of the body part of the viewer performing the action is the same as the virtual position of the virtual device in the first scene, and the action pose is the pose of holding the device, it may be determined that the action information includes the action of holding the virtual device.

In one embodiment, there may be two implementation methods of "obtaining the viewer's action information during the process of experiencing the first scene." The two methods correspond to the methods mentioned in the first preset action, and details are not described herein again.

A third type of preset action: an action of the viewer holding a real object.

It may be understood that in the real world, a viewer may hold a selfie stick or a device with a camera such as a smartphone or a PAD to take a selfie. During the process of the viewer experiencing the first scene, if the viewer needs to take a selfie, the viewer may hold the real object that exists in the real world, and the real object may be a real device with a camera that exists in the real world. Or, the viewer may hold real objects that exist in the real world that may be similar to the real device, for example, a stick may be analogous to a selfie stick, a pencil case may be analogous to a smart phone, and so on.

In one embodiment, detecting whether the first condition is satisfied includes: obtaining the action information of the viewer during the process of experiencing the first scene; detecting whether the action information includes the action of the viewer holding the real object; and if the action information includes the action of the viewer holding the real object, it may be determined that the first condition is satisfied, otherwise the first condition is not satisfied.

In one embodiment, there may be two implementation methods of "obtaining the viewer's action information during the process of experiencing the first scene." The two methods correspond to the methods mentioned in the first preset action, and details are not described herein again.

A fourth type of preset action: an action of the viewer posing a preset selfie pose.

In one embodiment, the viewer may set a selfie pose corresponding to the selfie in the electronic device in advance, and the preset action may be an action that the viewer often makes while taking the selfie. For example, the viewer may often make a "peace" pose, a "stomach-covering" pose, a "facing-covering" pose, or a "jumping" pose, etc. while taking the selfie, and the viewer may set one or more of these poses that he often makes as the selfie poses while taking the selfie in advance.

In one embodiment, detecting whether the first condition is satisfied includes: obtaining the action information of the viewer during the process of experiencing the first scene; detecting whether the action information belongs to the preset selfie pose; and if the action information belongs to the preset selfie pose, it may be determined that the first condition is satisfied, otherwise the first condition is not satisfied.

In one embodiment, there may be two implementation methods of "obtaining the viewer's action information during the process of experiencing the first scene." The two methods correspond to the methods mentioned in the first preset action, and details are not described herein again.

In one embodiment, the preset selfie pose may be an action that is not often performed by the viewer while taking the selfie and may be any action. The detail will not be described herein again.

A second method for detecting whether the first condition is satisfied includes: detecting whether a preset button may be touched.

The preset button may be a physical button located in the real world or a virtual button in the first scene.

A third method for detecting whether the first condition is satisfied includes: detecting whether the viewer may be observing a virtual object configured with a light reflecting function in the first image.

In one embodiment, the virtual object configured with the light reflecting function may be determined based on a specific first scene. For example, the virtual object may be a virtual mirror or a virtual body of water (for example, a river, a lake, an ocean, etc.).

A fourth method for detecting whether the first condition is satisfied includes: detecting whether the viewer may be observing the virtual object configured with the light reflecting function in the first image; obtaining a virtual distance between the viewer and the virtual object in the first scene; and determining whether the first condition is satisfied based on the virtual distance.

In one embodiment, determining whether the first condition is satisfied based on the virtual distance may include: if the virtual distance is less than or equal to a preset threshold, it may be determined that the first condition is satisfied; and if the virtual distance is greater than the preset threshold, it may be determined that the first condition is not satisfied.

It may be understood that in a real scene, if the viewer is far away from a real object (such as a mirror) configured with the light reflecting function, the viewer may not observe the displayed image of the real object. When the distance between the viewer and the real object is gradually reduced, the viewer may observe the real object that may display an image including the viewer. Similar to the real-world phenomenon, if the virtual distance between the viewer and the virtual object in the first scene is greater than the preset threshold (i.e., the virtual distance of the viewer and the virtual object in the first scene is far), the first condition may not be satisfied even if the viewer sees that the first image includes the virtual object. Further, if the virtual distance between the viewer and the virtual object in the first scene is less than or equal to the preset threshold and the viewer sees the virtual object, the first condition may be satisfied.

A fifth method for detecting whether the first condition is satisfied includes: detecting whether the viewer may be observing the virtual device configured to collect and display the collection function.

In one embodiment, the virtual device may be a virtual device with a camera and a display device, such as a virtual camera, a virtual smart phone, a virtual PAD, a virtual laptop, or a virtual desktop. Further, the virtual device may also be a device with a camera, a display device, and a selfie stick.

S103, displaying a second image based on satisfying at least the first condition.

In particular, the second image may include: characterizing a character image of the viewer and an image of a second portion of the first scene, and the first portion and the second portion may be different.

Figure 2B:
Figure 2C:
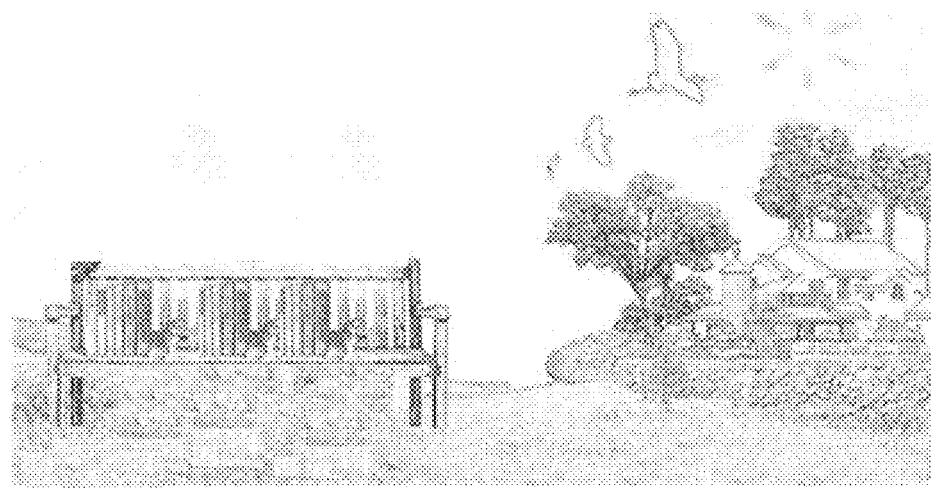
Figure 2D:
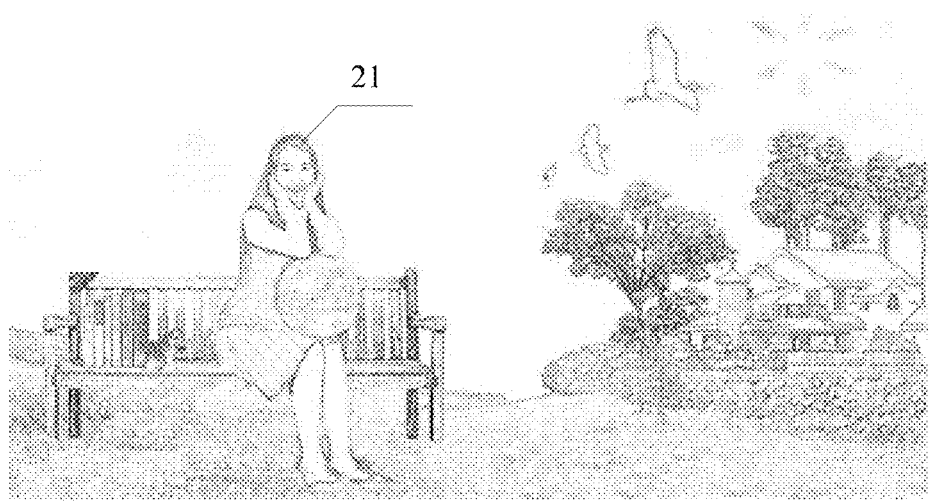

Still using FIGS. 2a to 2c as an example, FIG. 2d may be the second image.

It may be understood that although the schematic diagram shown in FIG. 2d includes a full body image of a character image, it may be understood that the second image may also only include a part of the character image, such as only the head of the character image or the upper body of the character image.

The embodiment of the present disclosure provides a display method. The method includes: displaying a first image based on a first scene; detecting whether a first condition may be satisfied; and displaying a second image based on satisfying at least the first condition, where the first image may be an image corresponding to an image of a first portion of the first scene, and the first portion may be different from a second portion. Since the second image may include a character image characterizing the viewer and the second partial image in the first scene, the viewer may observe himself integrated into the second image of the first scene, thereby enabling the viewer to observe himself experiencing the virtual scene or the augmented reality scene, and increasing the immersion of the viewer in the virtual scene.

Figure 4:
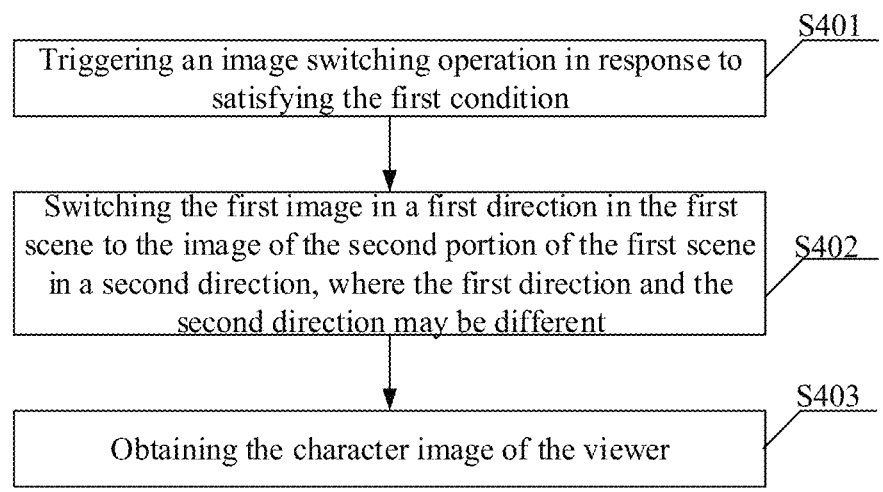
FIG. 4 is a flowchart of an implementation method of displaying a second image based on satisfying at least a first condition according to an embodiment of the present disclosure.

FIG. 4 is a flowchart of an implementation method of displaying a second image based on satisfying at least the first condition according to an embodiment of the present disclosure. The display method is described in more detail below.

S401, triggering an image switching operation in response to satisfying the first condition.

S402, switching the first image in a first direction in the first scene to the image of the second portion of the first scene in a second direction, where the first direction and the second direction may be different.

There are many methods for determining the second direction. The embodiments of the present disclosure provide, but are not limited to, the following methods.

In a first method, the second direction may be any direction that may be different from the first direction.

For example, the first direction may be relative to the viewer. If the first direction is the front of the viewer, the second direction may be the back, left, right, above, or below the viewer, etc.

In a second method, the second direction may be determined based on the first condition.

If the first condition is that the viewer's input action is a preset action, in one embodiment, the preset action may include an action that may indicate the second direction. For example, if the preset action is an action of the viewer pretending to hold a device, in the first scene, the direction of the viewer's palm facing toward a part of the viewer's body (e.g., the head or the foot) may be the second direction; if the preset action is an action of the viewer holding a virtual device, the direction of the display screen of the virtual device faces may be the second direction; or, if the preset action is an action of the viewer holding a real object, the virtual position of the real object in the first scene pointing to the direction of the virtual position of the viewer in the first scene may be the second direction. Further, if the preset action is a selfie pose preset by the viewer, the second direction may be any direction other than the first direction.

In one embodiment, if the first condition is the viewer touching a button, then the second direction may be any direction other than the first direction.

Further, if the first condition is the viewer observing a virtual device configured to collect and display a collection function in the first image, then the direction of the camera for capturing the image in the virtual device may be the second direction.

Furthermore, if the first condition is the viewer observing a virtual device configured with a light reflecting function in the first image, then the second direction may be obtained based on a virtual positional relationship between a virtual object and the viewer in the first scene.

In a third method, the second direction may be determined based on the first direction.

The first direction and the second direction may be opposite directions of the same position.

The "same position" mentioned above will be described below.

A target object may be a virtual object configured with a light reflecting function, or a virtual object configured to collect and display a collection function, or a real object held by a viewer, or a body part of the viewer performing a preset action.

It may be understood that even for the same second direction, the position of the target object in the first scene may be different, and the obtained second image may include different content or size. For example, the closer an object to the target object in a second partial image corresponding to the second direction in the first scene is, the larger the object may be in the second image, and the farther the object to the target object is, the smaller the object may be in the second image.

It may be understood that assuming that the target object is a virtual device, the virtual device may include a virtual camera. Since the Field of View (FOV) of the virtual camera may be limited, the coverage range of the image of the second direction of the first scene may be limited. The image that may be covered by the virtual camera may be recorded in the virtual camera, and the image that mat not be covered may not be recorded in the camera. Different virtual positions of the virtual camera in the first scene may cover different images of the second direction in the first scene to obtain different second images.

It may be understood that in the real world, when a user looks in the mirror, the user may see different images in the mirror with the line of sight in different directions. If the distance between the user and the mirror is different, even if the user is looking at the mirror with the same line of sight, the user may see different images in the mirror. Assuming the target object is a virtual object, since the second image may be obtained by the principle of the virtual object simulating the reflect light, which may be analogous to the mirror example in the real world, the virtual object may have different virtual positions in the first scene, and the obtained second images may be different.

S403, obtaining the character image of the viewer.

Figure 5A:
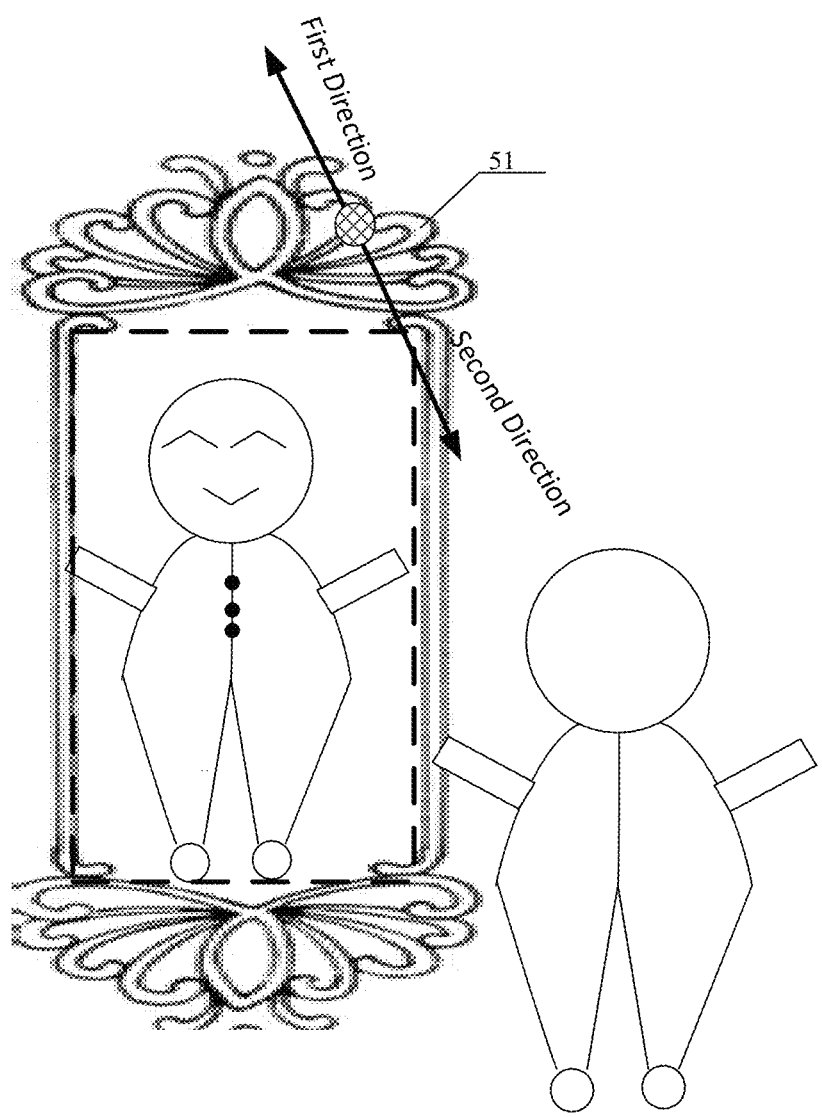
FIGS. 5a to 5b are schematic diagrams of another illustration of an image related to the first scene according to an embodiment of the present disclosure.
Figure 5B:
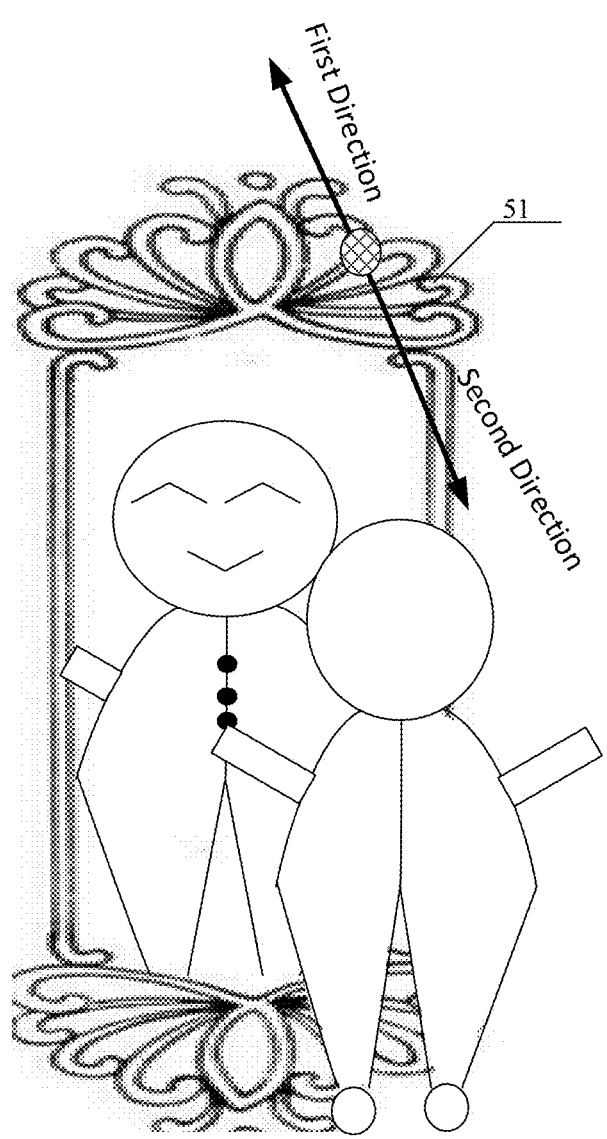

FIGS. 5a to 5b are schematic diagrams of another illustration of an image related to the first scene according to an embodiment of the present disclosure.

The application scenario shown in FIG. 5a is a viewer observing a virtual mirror 51 in the first scene, and the virtual mirror 51 may be a virtual object configured with a light reflecting function.

The circle filled with mesh in FIG. 5a may indicate the virtual position of the virtual mirror 51 in the first scene, the first direction may be the direction of the line of sight (i.e., a virtual observation point pointing towards the direction of the virtual object) of the viewer's eyes (referred to as the virtual viewing point in the embodiments of the present disclosure) looking at the mirror, and the second direction and the first direction may be the opposite direction of the virtual mirror 51, as shown in FIG. 5a.

If the viewer is close to the virtual mirror 51, for example, the virtual distance between the viewer and the virtual mirror 51 in FIG. 5a in the first scene may be greater than the virtual distance between the viewer and the virtual mirror 51 in FIG. 5b in the first scene.

Since the virtual distance between the virtual mirror 51 and the viewer in the first scene may be short, the viewer's foot may not be displayed in the virtual mirror 51, and only a part of the viewer's arm may be displayed.

S303, obtaining a character image of the viewer.

There are many methods to obtain the character image of the viewer. The embodiments of the present disclosure provide, but are not limited to, the following methods.

A first method of obtaining the character image includes: obtaining a real image of the viewer captured by a camera to obtain the character image.

If the display method provided by the embodiment of the present disclosure is applied to a head-mounted display device, the real image of the viewer captured by the camera may be an image of the viewer wearing the head-mounted display device. If the display method provided by the embodiment of the present disclosure is applied to a television, a laptop, a desktop, etc., the viewer may not be wearing the head-mounted display device in the real image of the viewer captured by the camera.

A second method of obtaining the character image includes: obtaining a real image of the viewer captured by a camera; and modifying the real image to obtain the character image.

If the display method provided by the embodiment of the present disclosure is applied to a head-mounted display device, the real image of the viewer captured by the camera may be an image of the viewer wearing the head-mounted display device. The image of the viewer wearing the head-mounted display device may be modified to obtain an image of the viewer not wearing the head-mounted display device.

In one embodiment, whether the viewer has the head-mounted display device in the real image of the viewer captured by the camera, the viewer may also modify the viewer's accessories (e.g., one or more of a pair of glasses, a necklace, a crown, and a hat) in the real image or modify the viewer's personal costume (e.g., makeup, clothing, etc.) in the real image.

A third method of obtaining the character image includes: obtaining an account image of a user account of the viewer to obtain the character image.

The account image may be an image of the viewer himself, or an image of another user. As such, the viewer may also obtain a second image merged with an image of his friend in the first scene.

A fourth method of obtaining the character image includes: obtaining an account image of the viewer's user account to obtain the character image; and modifying the account image to obtain the character image.

In one embodiment, the viewer may also modify the viewer's accessories (e.g., one or more of a pair of glasses, a necklace, a crown, and a hat) in the account image or modify the viewer's personal costume (e.g., makeup, clothing, etc.) in the account image.

A fifth method of obtaining the character image includes: obtaining a pre-stored image to obtain the character image.

The pre-stored image may be the viewer's image or an image of another user, where another user may not be the viewer.

A sixth method of obtaining the character image includes: obtaining a pre-stored image; and modifying the pre-stored image to obtain the character image.

In one embodiment, the viewer may also modify the viewer's accessories (e.g., one or more of a pair of glasses, a necklace, a crown, and a hat) in the pre-stored image or modify the viewer's personal costume (e.g., makeup, clothing, etc.) in the pre-stored image.

S304, displaying the second image.

In one embodiment, the viewer may also store the second image such that the second image may be shared.

In one embodiment, S304 may further includes: previewing the second image; detecting an instruction to store the second image; and storing the second image.

In one embodiment, S304 may further includes: obtaining an orientation of the character that indicates the position of the viewer in the first scene; integrating the character image into a corresponding position of the second partial image of the first scene based on the character orientation and the first direction to obtain the second image.

In one embodiment, the electronic device may include a display and displaying the second image may include: switching from the first image to the second image, or superimposing the second image on the currently displayed first image, or displaying the first image in a first area of a display area and displaying the second image in a second area of the display area.

In one embodiment, superimposing the second image on the currently displayed first image may include: displaying the first image in full screen on the display area, displaying the second image in the second display area of the display area, and the second area may be a partial area of the display area. At this point, the second image may block a partial image of the first image. Alternatively, superimposing the second image on the currently displayed first image may include: displaying the first image in full screen on the display area, and displaying the second image in full screen on the display area. At this point, the second image may complete cover the first image.

In one embodiment, displaying the first image in the first area of the display area and displaying the second image in the second area of the display area may include: displaying the second image in full screen on the display area, and displaying the first image in the first area of the display area. At this point, the entire display area may be the second area, and the first area may be a partial area of the second area. Alternatively, displaying the first image in the first area of the display area and displaying the second image in the second area of the display area may include: displaying the second image in the second area of the display area, and displaying the first image in the first area of the display area. At this point, the first area and the second area may both be the partial areas of the display area, and the first area and the second area may be different.

In one embodiment, "displaying the second image" mentioned above may further include: determining the second area of the display area in which the second image may be displayed; determining a range to display the second image; and displaying the second image having a corresponding range in the second area.

In one embodiment, "determining the second area of the display area in which the second image may be displayed: may include: determining a virtual object configured with a light reflecting function or a virtual position of a virtual device configured to collect and display a collection function in the first image of the first scene; determining the virtual object in the first image or a target display area for displaying an image in the virtual device; and setting the target display area as the second area.

In one embodiment, "determining a range to display the second image" may include: determining the range to display the second image based on a virtual positional relationship of the virtual object and the viewer's virtual observation point in the first scene and/or a virtual position of the virtual observation point in the first scene. Alternatively, determining a range to display the second image" may include: determining the range to display the second image based on a virtual field of view of the target display area of the virtual device in the first scene and a virtual positional relationship of the virtual device and the viewer in the first scene.

For a person skilled in the art to better understand the determination process of the second area provided by the embodiments of the present disclosure, and the determination process of the second image, a specific example will be described below.

The application scenario shown in FIG. 5a is a viewer observing a virtual mirror 51 in the first scene, and the virtual mirror 51 may be a virtual object configured to reflect light.

The target display area (framed with a broken line) for displaying the image in the virtual mirror 51 may be the second area, that is, the second image may be displayed in the target display area.

When the viewer looks at the virtual mirror 51, the viewer may see the target display area in the virtual mirror 51 displaying a second image including the viewer.

It may be seen from FIG. 5a that the other areas of the display area of the electronic device other than the target display area may be still displaying the first image. That is, the first image may be displayed in full screen in the display area, and the second image may be displayed in the second area of the display area.

In summary, FIG. 5a illustrates the determination process for the second area.

If the viewer is close to the virtual mirror 51, for example, the virtual distance between the viewer and the virtual mirror 51 in FIG. 5a in the first scene may be greater than the virtual distance between the viewer and the virtual mirror 51 in FIG. 5b in the first scene.

Due to the limitation of the viewing angle of the target display area in the virtual mirror 51, the viewer's foot may not be displayed in the virtual mirror 51, and only a part of the viewer's arm may be displayed.

The change of the second image illustrated by the virtual mirror 51 in FIG. 5a and FIG. 5b indicate that the virtual object may have different positional relationship with the viewer in the first scene, and the range in which the second image may be displayed may be different.

FIGS. 6a to 6e are schematic diagrams of still another illustration of an image related to the first scene according to an embodiment of the present disclosure.

Figure 6A:
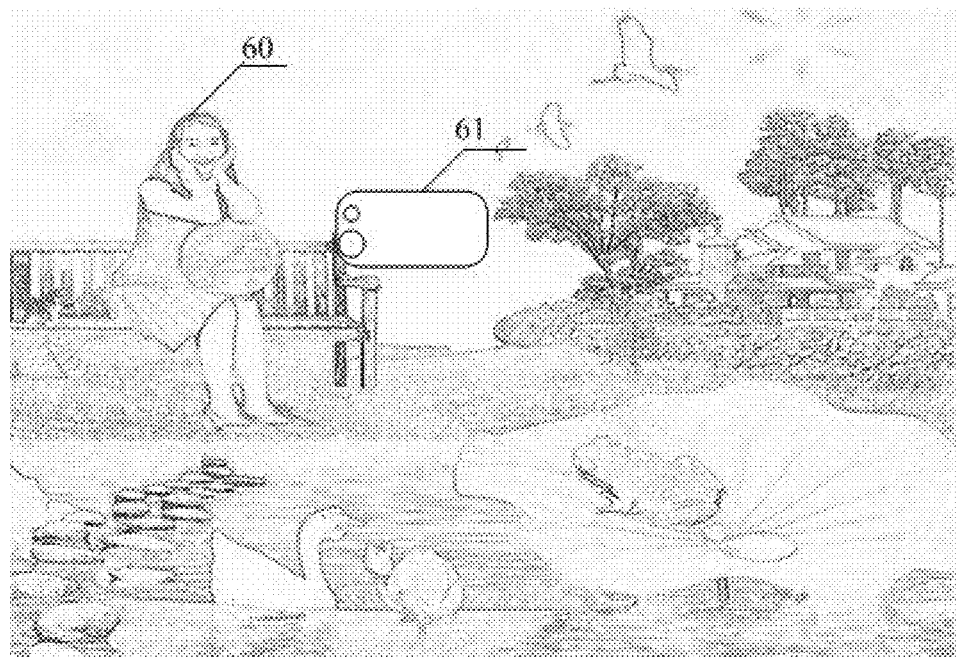
FIGS. 6a to 6e are schematic diagrams of still another illustration of an image related to the first scene according to an embodiment of the present disclosure.
Figure 6B:
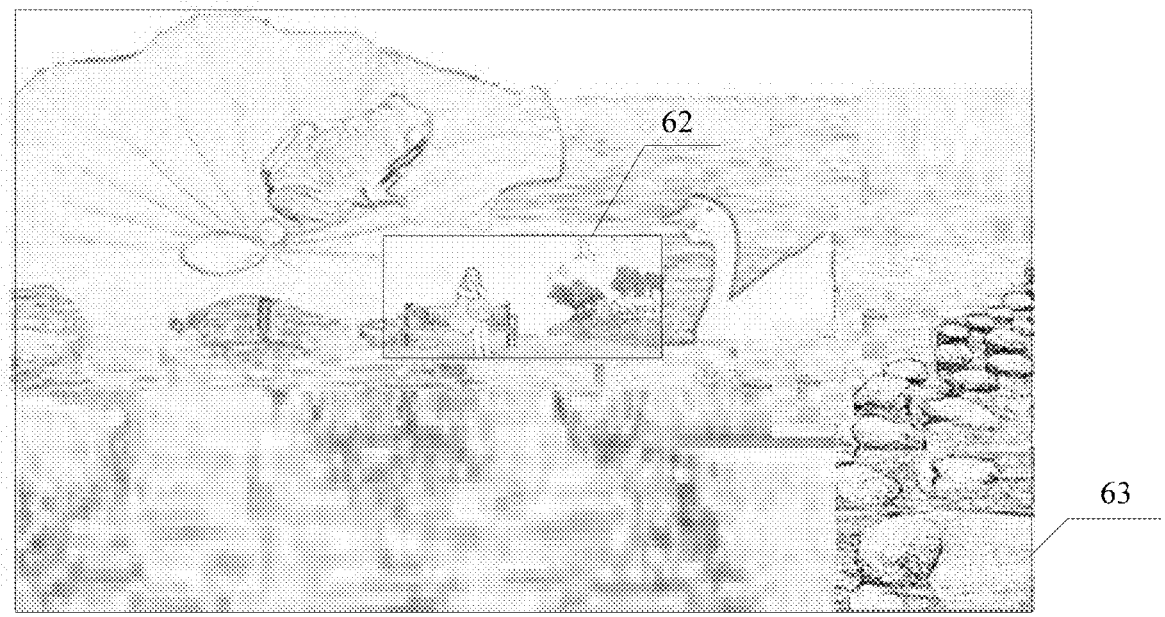

The application scenario shown in FIG. 6a (corresponding to FIG. 2a) may be: the viewer 60 may be viewing the virtual device 61 configured to collect and display a collection function in the first scene (accusing the virtual device is a virtual mobile phone), and the virtual device 61 may be assumed to be in the position shown in FIG. 6a.

The target display area of the virtual device 61 may be the second area, that is, the second area may display the second image.

For the viewer, the first image observed by the viewer is shown in FIG. 2b.

As shown in FIG. 2d, the range in which the second image may be displayed may be determined based on the field of view of the target display area of the virtual device 61, and the virtual positional relationship of the virtual device 61 and the viewer in the first scene.

Figure 6C:
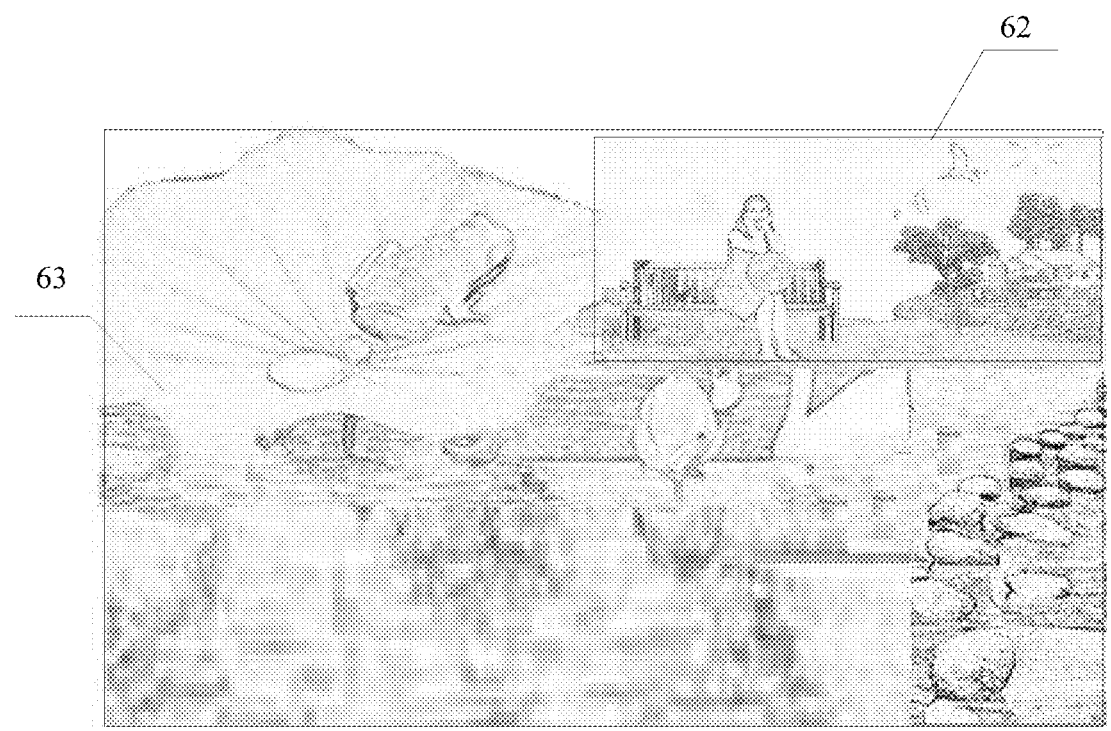
Figure 6D:
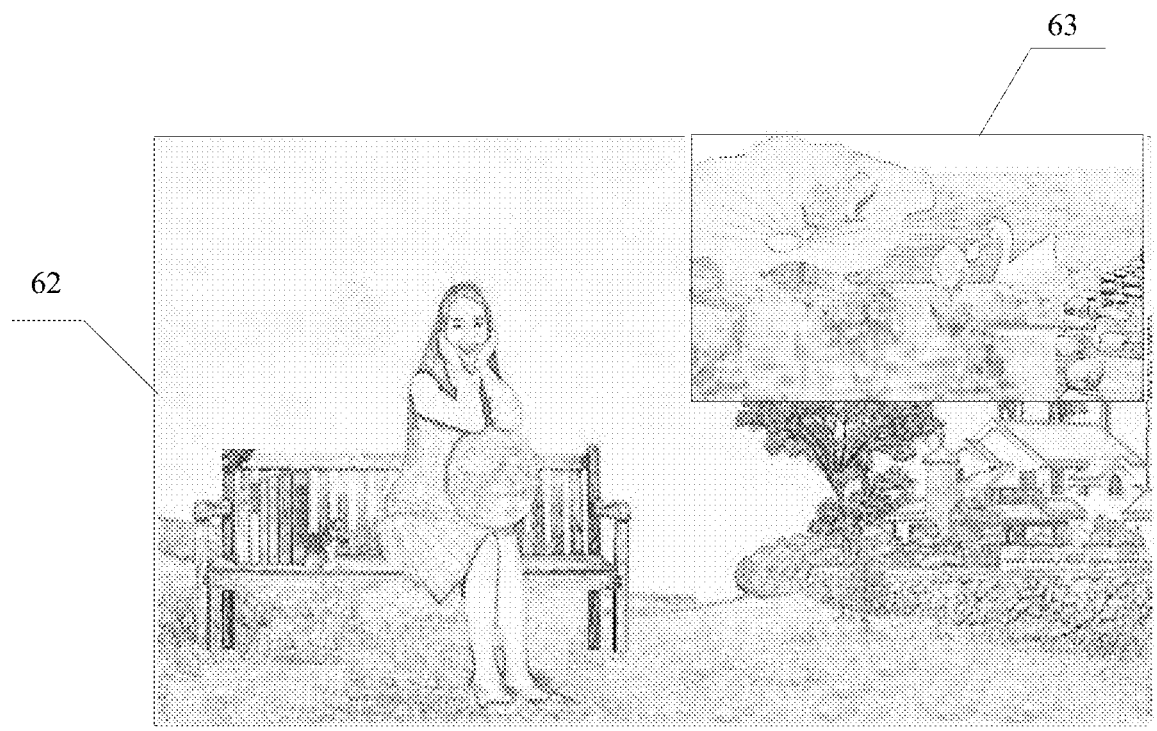

FIG. 6d illustrates a schematic diagram of a relationship between the first area 63 and the second area 62.

The second area 62 may be the target display area of the virtual device 61 in the first scene, and the second area 62 may display the second image as shown in FIG. 2d. The first area 63 may display the first image as shown in FIG. 2b. That is, the display area may display the first image in full screen, the entire display area may be the first area, and the second area may be the partial area of the first area.

Figure 6E:
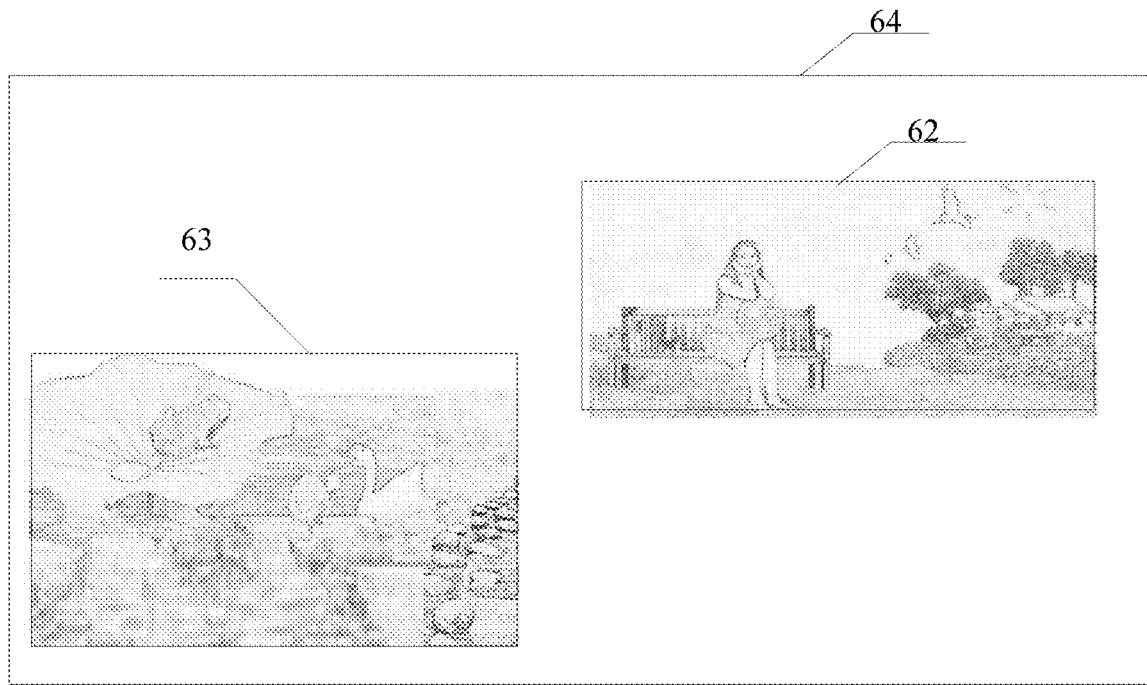

In one embodiment, the relationship between the first area 63 and the second area 62 may be as shown in FIG. 6c to FIG. 6e.

In FIG. 6c, the display area may display the first image in full screen, the entire display area may be the first area 63, and the second area 62 may be any partial area of the first area.

In FIG. 6d, the display area may display the second image in full screen, the entire display area may be the second area 62, and the first area 63 may be any partial area of the second area 62.

In FIG. 6e, the first area 63 and the second area 62 may both be the partial areas in the display area 64, and the first area and the second area may be different.

The embodiments mentioned above describe the display method of the present disclosure in detail. The display method of the present disclosure may be implemented in various forms of apparatus. Therefore, the present disclosure further discloses an apparatus, and a specific embodiment will be described in detail below.

Figure 7:
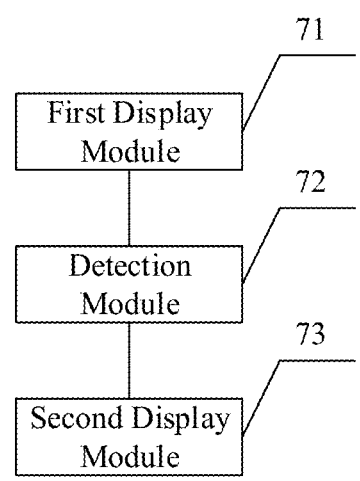
FIG. 7 is a structural diagram of an implementation method of a display apparatus according to an embodiment of the present disclosure; and, FIG. 8 is a structural diagram of an implementation method of an electronic device according to an embodiment of the present disclosure.

FIG. 7 is a structural diagram of an implementation method of a display apparatus according to an embodiment of the present disclosure. The display apparatus includes:

A first display module 71 for displaying a first image based on a first scene.

A detection module 72 for detecting whether a first condition may be satisfied.

A second display module 73 for displaying a second image based on satisfying at least the first condition.

The first image may be an image corresponding to a first portion of the first scene, and the second image may include a character image characterizing a viewer and an image of a second portion of the first scene, where the first portion may be different from the second portion.

In one embodiment, the second display module 73 may include:

A triggering module for triggering an image switch operation in response to satisfying the first condition.

A switching module for switching the first image in the first direction of the first scene to the image of the second portion in the second direction of the first scene, where the first direction and the second direction may be different.

A first acquisition unit for acquiring the character image of the viewer.

A first display unit for displaying the second image.

In one embodiment, the first direction and the second direction may be opposite directions of the same position.

In one embodiment, the detection module may include: a first detecting unit for detecting whether an input action of the viewer belong to a preset action; or a second detecting unit for detecting whether the viewer may be observing a virtual object configured with a light reflecting function in the first image; or a third detecting unit for detecting whether the viewer may be observing a virtual device configured to collect and display a collection function in the first image.

In one embodiment, the first acquisition module may include: a first acquisition subunit for acquiring a real image of the viewer captured by a camera to obtain the character image; or a second acquisition subunit for acquiring the real image of the viewer captured by the camera and modifying the real image to obtain the character image; or a third acquisition subunit for acquiring an account image of a user account of the viewer to obtain the character image; or a fourth acquisition subunit for acquiring the account image of a user account of the viewer and modifying the account image to obtain the character image.

In one embodiment, the first display unit may include: a fifth acquisition subunit for acquiring an orientation of character direction that indicates the viewer in the first scene; and an image integrating subunit for integrating the character image into a corresponding position of the second partial image of the first scene based on the orientation of character and the first direction to obtain the second image.

In one embodiment, the second display module may include: a second display unit for displaying the second image in a second area of a display area, where the second area may be a full screen area or a partial area of the display area.

In one embodiment, the second display unit for displaying the second image in a partial area of the display area may include: a display subunit for displaying the first image in a first area of the display area and displaying the second image in the second area of the display area. The first area and the second area may be different partial areas in the display area, or the second area may be a partial area of the first area, or the first area may be a partial area in the second area.

Figure 8:
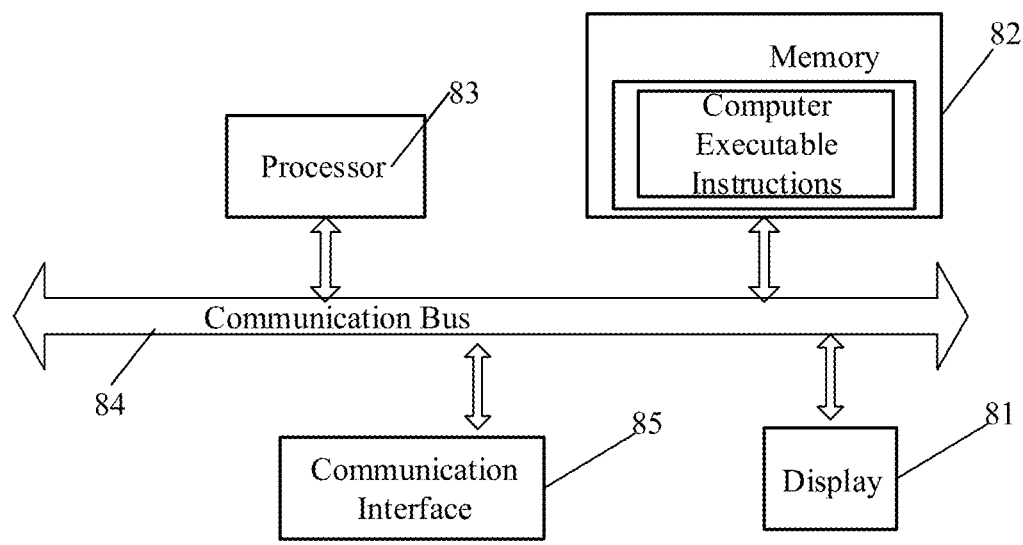

FIG. 8 is a structural diagram of an implementation method of an electronic device according to an embodiment of the present disclosure. The electronic device includes:

A display 81 for displaying an image.

A memory 82 for storing computer executable instructions.

A processor 83 for executing the computer executable instructions. The computer executable instructions may be specifically used to: control the display to display a first image based on a first scene; detect whether a first condition may be satisfied; and control the display to display a second image based on satisfying at least the first condition. Further, the first image may be an image corresponding to a first portion of the first scene, and the second image may include a character image characterizing a viewer and an image of a second portion of the first scene, where the first portion may be different from the second portion.

The memory 82 may include a high-speed RAM, and it may also include a non-volatile memory, such as at least one disk memory.

The processor 83 may be a Central Processing Unit (CPU), or an Application Specific Integrated Circuit (ASIC), or one or more integrated circuits configured to implement the embodiments of the present disclosure.

In one embodiment, the electronic device may further include a communication bus 84 and a communication interface 85. The display 81, memory 82, processor 83, and the communication interface 85 may communicate with each other through the communication bus 84.

In one embodiment, the communication interface 85 may be an interface to a communication module, such as an interface of a GSM module.

The embodiment of the present application further provides a readable storage medium for storing computer executable instructions. When the computer executable instructions are executed by the processor, the processes included in any of the display methods described above may be implemented. The functional modules, such as the detection module, in the present disclosure may include one or more computer programs stored in computer readable storage medium. When executed by one or more processors, the computer programs implement the corresponding function of the modules. A functional module, in some embodiments, may be a hardware module, or a module that is implemented by a combination of software and hardware components.

Finally, it is noted that any relational terms such as "first" and "second" in this document are only meant to distinguish one entity from another entity or one operation from another operation, but not necessarily request or imply existence of any real-world relationship or ordering between these entities or operations. Moreover, it is intended that terms such as "include", "have" or any other variants mean non-exclusively "comprising". Therefore, processes, methods, articles or devices which individually include a collection of features may not only be including those features, but may also include other features that are not listed, or any inherent features of these processes, methods, articles or devices. Without any further limitation, a feature defined within the phrase "include a . . . " does not exclude the possibility that process, method, article or device that recites the feature may have other equivalent features.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made reference to the description of the methods.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A display method for an electronic device, comprising:
    displaying, by a display of the electronic device, a first image based on a first scene;

detecting, by a processor of the electronic device, whether a first condition with respect to a viewer in the first scene is satisfied;
in response to the first condition being satisfied, switching the first image in a first direction of the first scene to a second image in a second direction in the first scene, wherein:
the first image corresponds to a first portion of the first scene;
the second image includes a character image of the viewer and an image corresponding to a second portion of the first scene, the second portion being different from the first portion; and
the first direction is different from the second direction;
obtaining the character image of the viewer, including one of:
obtaining a real image of the viewer captured by a camera to obtain the character image;
obtaining the real image of the viewer captured by the camera and modifying the real image to compose the character image;
obtaining an account image of a user account of the viewer to obtain the character image; or,
obtaining the account image of the user account of the viewer and modifying the account image to compose the character image; and
displaying, by the display, the second image.

2. The method of claim 1, wherein the first direction and the second direction are opposite directions of a same position.

3. The method of claim 1, wherein detecting whether the first condition is satisfied comprises:
detecting whether an input action of the viewer is a preset action; or,
detecting whether the viewer is observing a virtual object with a light reflecting function in the first image; or,
detecting whether the viewer is observing a virtual device with an image collection and display function in the first image.

4. The method of claim 1, wherein displaying the second image comprises:
obtaining an orientation of character indicating the orientation of viewer in the first scene; and
integrating the character image into a position of the image corresponding to the second portion of the first scene based on the orientation of character and the first direction to obtain the second image.

5. The method of according to claim 1, wherein displaying the second image comprises:
displaying the second image in a second area of a display area, the second area being a full screen area or a partial area of the display area.

6. The method of claim 5, wherein displaying the second image in the second area of the display area comprises:
displaying the first image in a first area of the display area and displaying the second image in the second area of the display area, wherein the first area and the second area are different partial areas in the display area, or the second area is a partial area in the first area, or the first area is a partial area in the second area.

7. A display apparatus of an electronic device, comprising:
a processor; and
a memory for storing instructions, when executed, causing the processor to:
control a first display module to display a first image in a display of the electronic device based on a first scene;
control a detecting module to detect whether a first condition with respect to a viewer in the first scene is satisfied;
in response to the first condition being satisfied, control a switching module to switch the first image in a first direction of the first scene to a second image in a second direction in the first scene, wherein:
the first image corresponds to a first portion of the first scene;
the second image includes a character image of the viewer and an image corresponding to a second portion of the first scene, the second portion being different from the first portion; and
the first direction is different from the second direction;
control an acquisition module to obtain the character image of the viewer, including one of:
obtaining a real image of the viewer captured by a camera to obtain the character image;
obtaining the real image of the viewer captured by the camera and modify the real image to compose the character image;
obtaining an account image of a user account of the viewer to obtain the character image; or
obtaining the account image of the user account of the viewer and modify the account to compose the character image; and
control a second display module to display the second image in the display.

8. The apparatus of claim 7, wherein the instructions, when executed, further cause the processor to:
control a triggering module to trigger an image switching operation in response to the first condition being satisfied.

9. The apparatus of claim 8, wherein the first direction and the second direction are opposite directions of a same position.

10. The apparatus of claim 7, wherein detecting whether the first condition is satisfied comprises:
detecting whether an input action of the viewer is a preset action; or,
detecting whether the viewer is observing a virtual object with a light reflecting function in the first image; or,
detecting whether the viewer is observing a virtual device with an image collection and display function in the first image.

11. The apparatus of claim 7, wherein displaying the second image comprises:
obtaining an orientation of character indicating the orientation of viewer in the first scene; and
integrating the character image into a position of the image corresponding to the second portion of the first scene based on the orientation of character and the first direction to obtain the second image.

12. The apparatus of claim 7, wherein displaying the second image comprises:
displaying the second image in a second area of a display area, the second area being a full screen area or a partial area of the display area.

13. The apparatus of claim 12, wherein displaying the second image in the second area of the display area comprises:
displaying the first image in a first area of the display area and displaying the second image in the second area of the display area, wherein the first area and the second area are different partial areas in the display area, or the second area is a partial area in the first area, or the first area is a partial area in the second area.

14. An electronic device comprising:
a display unit for displaying an image in a display of the electronic device;
a memory for storing computer executable instructions;
a processor for executing the computer executable instructions to:
control the display unit to display a first image in the display based on a first scene;
detect whether a first condition with respect to a viewer in the first scene is satisfied;
in response to the first condition being satisfied, switch the first image in a first direction of the first scene to a second image in a second direction of the first scene, wherein:
the first image corresponds to a first portion of the first scene;
the second image includes a character image of a viewer and an image corresponding to a second portion of the first scene, the second portion being different from the first portion; and
the first direction is different from the second direction;
obtain the character image of the viewer, including one of:
obtain a real image of the viewer captured by a camera to obtain the character image;
obtain the real image of the viewer captured by the camera and modify the real image to compose the character image;
obtain an account image of a user account of the viewer to obtain the character image; or
obtain the account image of the user account of the viewer and modify the account to compose the character image; and
control the display unit to display the second image in the display.

15. The electronic device of claim 14, wherein the processor further executes the computer executable instructions to:
trigger an image switching operation in response to the first condition being satisfied.

16. The electronic device of claim 15, wherein the first direction and the second direction are opposite directions of a same position.

17. The electronic device of claim 14, wherein detecting whether the first condition is satisfied comprises:
detecting whether an input action of the viewer is a preset action; or,
detecting whether the viewer is observing a virtual object with a light reflecting function in the first image; or,
detecting whether the viewer is observing a virtual device with an image collection and display function in the first image.

* * * * *